United States Patent
Wallström

(10) Patent No.: US 6,503,028 B1
(45) Date of Patent: Jan. 7, 2003

(54) SINTERED CUTTING INSERT HAVING CENTER HOLE FOR CLAMP SCREW

(75) Inventor: Lars-Gunnar Wallström, Sandviken (SE)

(73) Assignee: Sandvik Aktiebolag, Sandviken (SE)

( * ) Notice: Subject to any disclaimer, the term of this patent is extended or adjusted under 35 U.S.C. 154(b) by 0 days.

(21) Appl. No.: 09/880,961

(22) Filed: Jun. 15, 2001

(51) Int. Cl.⁷ .............................. B23C 5/00; B26D 1/12
(52) U.S. Cl. ........................................ 407/35; 407/43
(58) Field of Search ............................ 407/35, 40, 43, 407/46, 47, 48, 53, 56, 62, 113, 114, 115, 116

(56) References Cited

U.S. PATENT DOCUMENTS

| | | |
|---|---|---|
| 4,050,127 A | 9/1977 | Bodem et al. |
| 5,365,805 A | 11/1994 | Pantzar et al. |
| 5,382,118 A | 1/1995 | Satran et al. |
| 5,421,679 A | 6/1995 | Pantzar et al. |
| 5,685,670 A | 11/1997 | Satran |
| 5,718,540 A | 2/1998 | Satran et al. |
| 6,142,716 A | 11/2000 | Jordberg et al. |
| 6,193,446 B1 | 2/2001 | Aström et al. |
| 6,196,770 B1 | 3/2001 | Aström et al. |

FOREIGN PATENT DOCUMENTS

EP    0 707 911    4/1996

*Primary Examiner*—John A. Ricci
(74) *Attorney, Agent, or Firm*—Burns, Doane, Swecker & Mathis, LLP

(57) ABSTRACT

A cutting insert includes a body formed of sintered powder, with a center hole extending through the body for receiving a fastening screw. The center hole includes a cylindrical portion. The body includes two side surfaces extending downwardly from respective main cutting edges of the insert. A recess is formed in each side surface and extends to the bottom of the body. Each recess has a length longer than the diameter of the center hole. Preferably, the length of the recess is 120% of the diameter of the center hole.

8 Claims, 4 Drawing Sheets

SINTERED CUTTING INSERT HAVING CENTER HOLE FOR CLAMP SCREW

BACKGROUND OF THE INVENTION

The present invention relates to a cutting insert for application in rotary end mills for the machining of metallic workpieces. In particular, the invention relates to a cutting insert formed of sintered powder and having a center hole for receiving a fastener.

Milling inserts for end mills are generally manufactured through form-pressing and sintering of a cutting material-forming powder. Such inserts typically possess positive cutting edges having positive rake angles since these inserts have showed the ability to reduce the cutting forces and the power supply needed in a tooling machine while at the same time diminishing undesirable vibrations. It is often desirable to provide the tool with a geometry having a positive axial angle and a negative radial angle. In certain cases a combination of positive axial angle and zero degree radial angle can be used in order to obtain a helical chip that provides the best chip transport. The cutting insert is usually clamped by a center locking screw which passes through a center hole of the insert.

In order to enable the insert to machine a 90-degree shoulder in a workpiece which is substantially straight, it has been proposed to make the main cutting edge of the insert wave-shaped e.g., as disclosed in U.S. Pat. Nos. 6,142,716; 6,193,446; and 6,196,770.

Also, it has been proposed in U.S. Pat. No. 5,365,805 that each side surface along which a main cutting edge is formed be provided with a recess. The recess divides at least a lower region of the respective side surface into two spaced-apart abutment surface segments which abut against a support surface of the insert-receiving site when the insert is installed in a holder. The patent recites that the length of the recess can be as much as 25–35% of the length of the associated side surface. That dimensioning results in the length of the recess being less than the diameter of a main cylindrical part of the center hole of the insert.

That fact is important for the following reason. During the manufacture of the insert, powder is inserted into a container having the general shape of the final insert and is then compressed and sintered. During the compression step, a portion of the powder is pressed against a center core which functions to form the center hole in the inset. That portion of the powder becomes more highly compressed than the remaining powder, whereupon during the sintering step, the more compressed powder shrinks to a lesser extent. As a result, the respective side surfaces of the insert assume a slightly convex shape which can interfere with the ability of the side surfaces to form a stable abutment with the support surface of the insert-receiving site of the holder.

In the case of the above-described short recesses disclosed in U.S. Pat. No. 5,365,805, some of the convexity of the support surface will remain notwithstanding the presence of the recess. Moreover, in the case of U.S. Pat. No. 6,142,716, the recess does not extend to the bottom of the insert, whereby a short-height section of the side surface remains, which due to its convexity, could present an obstacle to achieving a stable abutment, if contacting the support surface.

SUMMARY OF THE INVENTION

The present invention relates to an indexible cutting insert for chip forming machining. The insert comprises a basically parallelogram shaped body which is formed of sintered powder. The body includes a top face forming two main cutting edges. Each main cutting edge is convex as the insert is viewed in a direction perpendicular to the top surface. The body also includes a bottom face, and two longitudinal side surfaces extending downwardly relative to respective main cutting edges. The body also includes two end faces spaced apart in a longitudinal direction of the insert. Each end face has a bevel provided on a portion of the body protruding in the longitudinal direction from the remainder of the body. Each of the side surfaces has a height increasing toward a respective active cutting corner of the insert such that the active cutting corner is raised with respect to an opposite end of the respective side surface. The side surfaces are generally inclined at an acute angle toward the top face and at an obtuse angle toward the bottom face. An upper portion of each of the side surfaces comprises a wave shaped primary clearance surface extending along the entire respective main cutting edge at a downward inclination to form a clearance angle. A center hole extends completely through the body from the top face to the bottom face and includes a cylindrical portion adapted to receive a threaded shank of a clamp screw. The center hole further includes an enlarged portion disposed adjacent the top face. A lower region of each longitudinal side surface defines an abutment surface adapted to engage a support surface of an insert site of a holder. The lower region includes a recess extending to the bottom surface and extending in the longitudinal direction for a distance equal to at least 120% of a diameter of the cylindrical portion of the center hole (preferably at least 120% of that diameter), wherein the recess extends beyond the entire cylindrical portion in the longitudinal direction of the insert as the insert is viewed in a direction toward the side surfaces.

The invention also pertains to a mill tool comprising a holder and the above-described indexible cutting insert, wherein the recess extends beyond the entire cylindrical portion in the longitudinal direction of the insert as the insert is viewed in a direction toward the side surfaces.

BRIEF DESCRIPTION OF THE DRAWINGS

The objects and advantages of the invention will become apparent from the following detailed description of a preferred embodiment thereof in connection with the accompanying drawings in which numerals designate like elements and in which.

DETAILED DESCRIPTION OF A PREFERRED EMBODIMENT OF THE INVENTION

Figure 5:
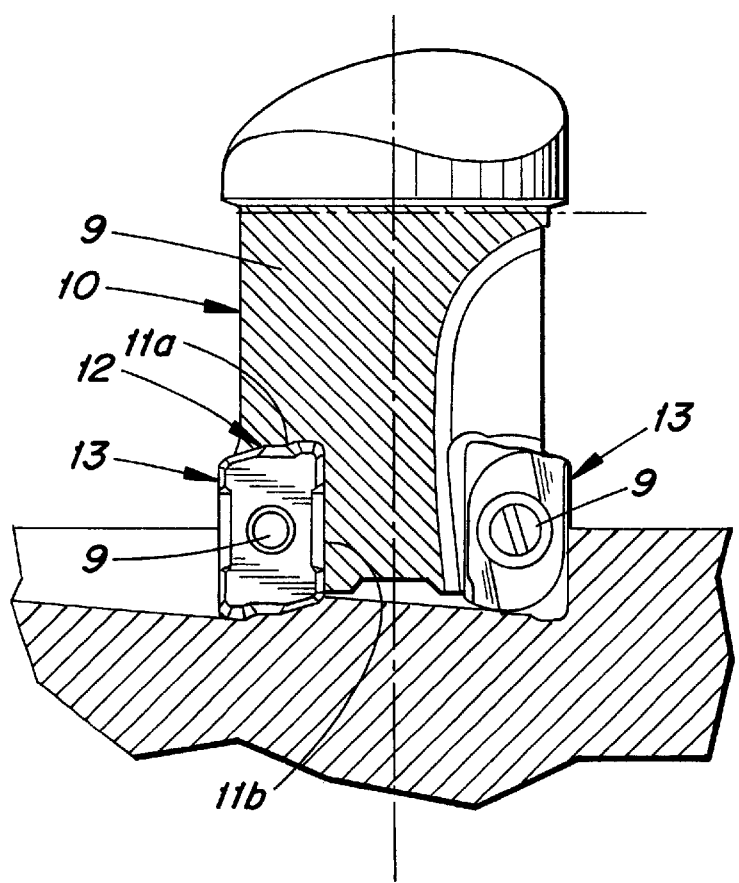
FIG. 5 is a longitudinal sectional view taken through the end mill depicting two of the cutting inserts.

Depicted in the FIG. 5 is an end mill 10 which includes a shaft 9 provided with prismatic elongated indexible inserts 13 according to the invention. The cutting inserts are produced by means of a direct pressing method in which a cemented carbide powder is given a desired shape in a press and then sintered in an oven at a temperature above 1000° C.

Figure 1:
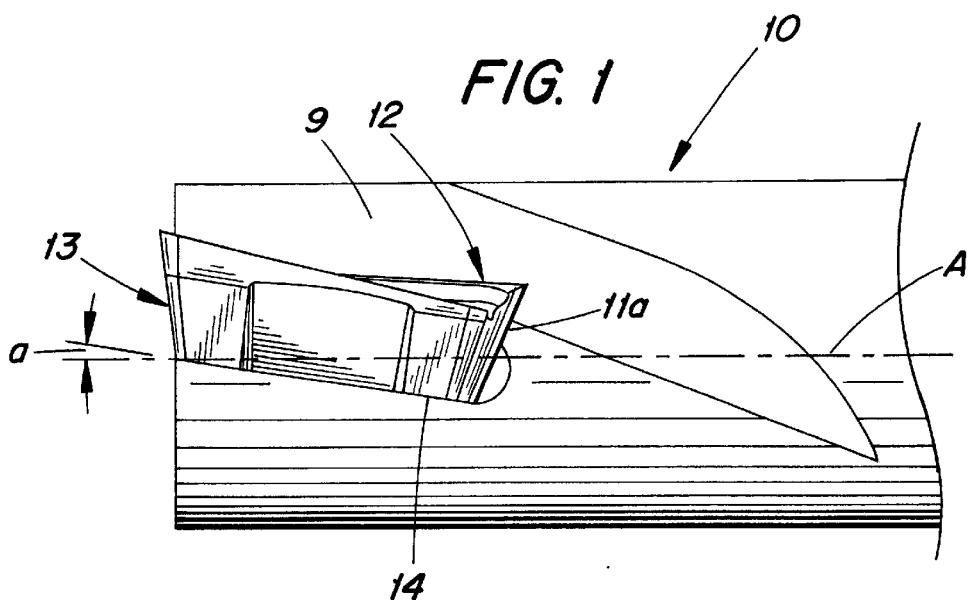
FIG. 1 is a side elevational view of an end mill provided with a cutting insert according to the present invention, the insert being viewed in a direction toward a side surface thereof.

The end mill comprises an essentially cylindrically shaped body, the rear part (not shown) of which is conical and intended to be clamped in a driver such as a chuck or spindle of a tooling machine by means of which the body can be rotated around a center axis A. The forward part of the end mill has a number of circumferentially spaced pockets 12 each defined by a bottom support surface 14, and one or more side supporting surfaces 11a, 11b upstanding therefrom (see FIGS. 1, 2) to receive a releaseably clamped indexible insert 13 in a work position.

The bottom surface 14 of each pocket 12 forms a positive axial angle a with a longitudinal axis of rotation A (see FIG. 1) combined with a zero radial angle or with positive radial angle. The size of this positive axial angle a should be greater than 0° and not greater than 20°, suitably 5–15°. The positive axial angle a will enable the chips to be easily lifted and thrown away from the workpiece.

The indexible insert 13 is preferably intended to be fastened in the respective pocket 12 by means of a clamp screw 9 which is received through a center hole 15 of the insert and threadably engaged in the milling body 10. Each center hole 15 includes a cylindrical portion 15a for receiving a threaded shank of the clamp screw 9, and an enlarged portion 15b for receiving a head of the screw.

The indexible insert 13 is essentially formed as an elongated parallelogram, including a top face 16 and a bottom face 17. Between the top face 16 and the bottom face 17 extend two longitudinal side surfaces 18, 19 and two end faces 20, 21. Each of the side surfaces 18, 19 intersects the top face 16 and the bottom surface 17 to form respective edges 24, 18'.

Figure 3:
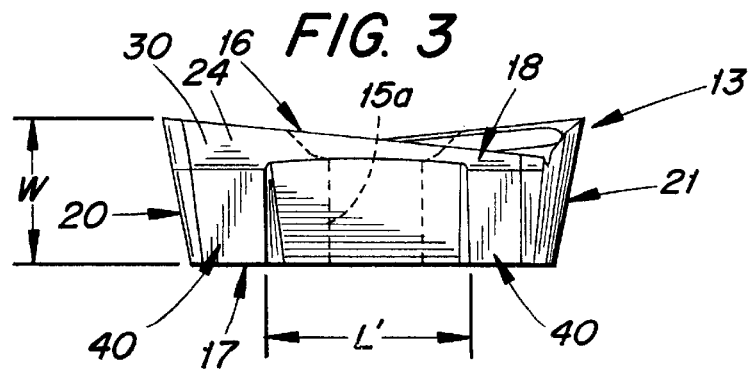
FIG. 3 is a side elevational view of the cutting insert.
Figure 4:
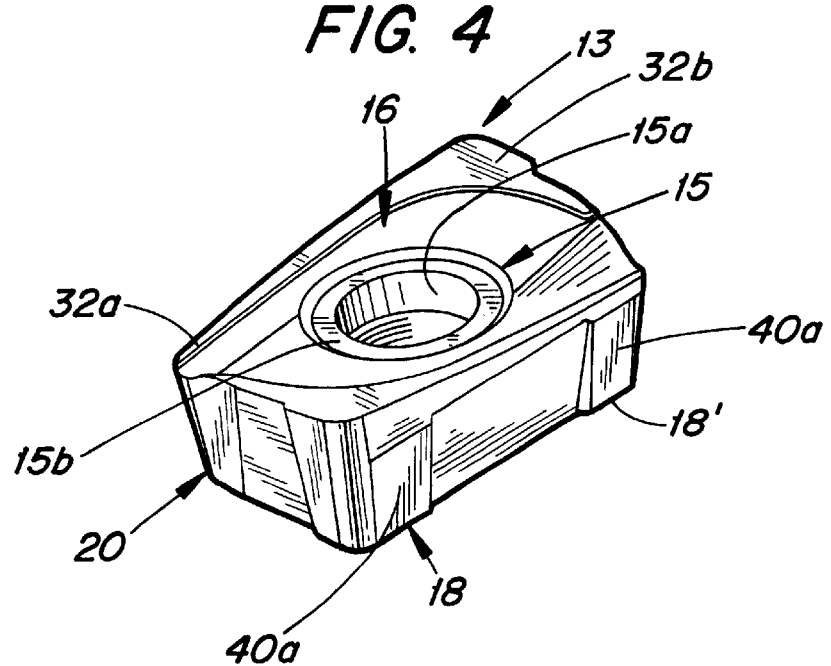
FIG. 4 is a top perspective view of the cutting insert.

The side surfaces 18, 19 have considerably larger longitudinal extensions (lengths) L than the laterally extending end faces 20, 21. These side surfaces 18, 19 are generally inclined at an acute angle relative to the top face 16 and at an obtuse angle relative to the bottom surface 17, as can be seen in FIG. 3. The end faces 20, 21 form diagonally opposite corners 22, 23, which protrude axially from the remainder of the insert body, i.e., in a direction parallel to the length dimension L. Each of the intersection lines between the top face 16 and a respective side surface 18 or 19 forms a generally longitudinally extending main cutting edge 24.

Each of the end faces 20, 21 intersects the top face 16 to form an active cutting edge during axial ramping.

Each of the longitudinal side surfaces 18, 19 is designed with increasing width W (height) towards the active cutting corner so that the active cutting corners become situated on respective elevated portions of the cutting insert (see FIG. 3). The cutting insert is formed such that both of the side surfaces 18, 19 and both of the end faces 20, 21 appear with positive clearance angle along the entire cutting edge in relation to the top face 16 of the cutting insert. Furthermore, the longitudinal side surfaces 18, 19 of the cutting insert, as viewed from the side (FIG. 3), have wave-shaped primary clearance surfaces 30 extending along the entire main cutting edge 24, with a large downward axial inclination from one edge face towards the other end face 20.

The top face 16 includes two lands, each having a narrow portion 32a extending along a respective longitudinal side surface 18 or 19, and a wide portion 32b extending along a respective end face 20 or 21.

Figure 2:
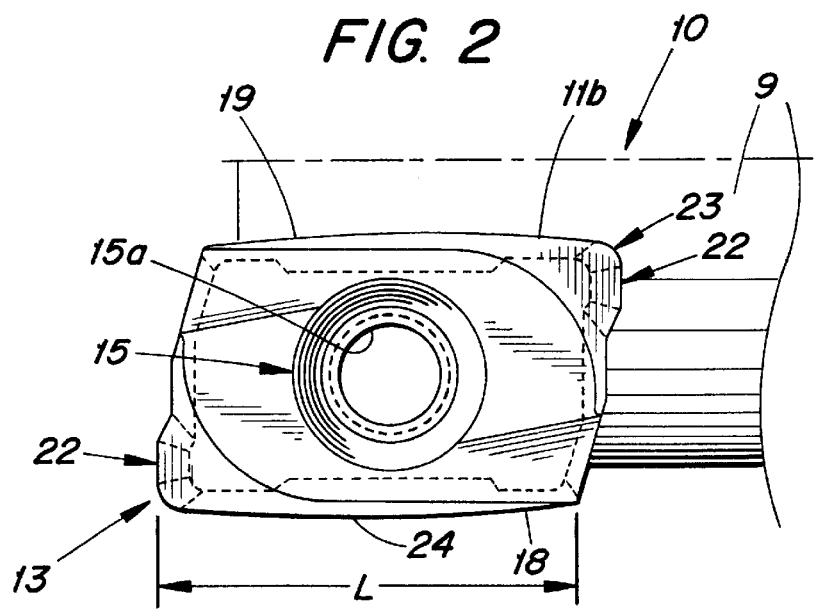
FIG. 2 is a view similar to FIG. 1 with the insert being viewed in a direction toward a top face thereof.
Figure 6:
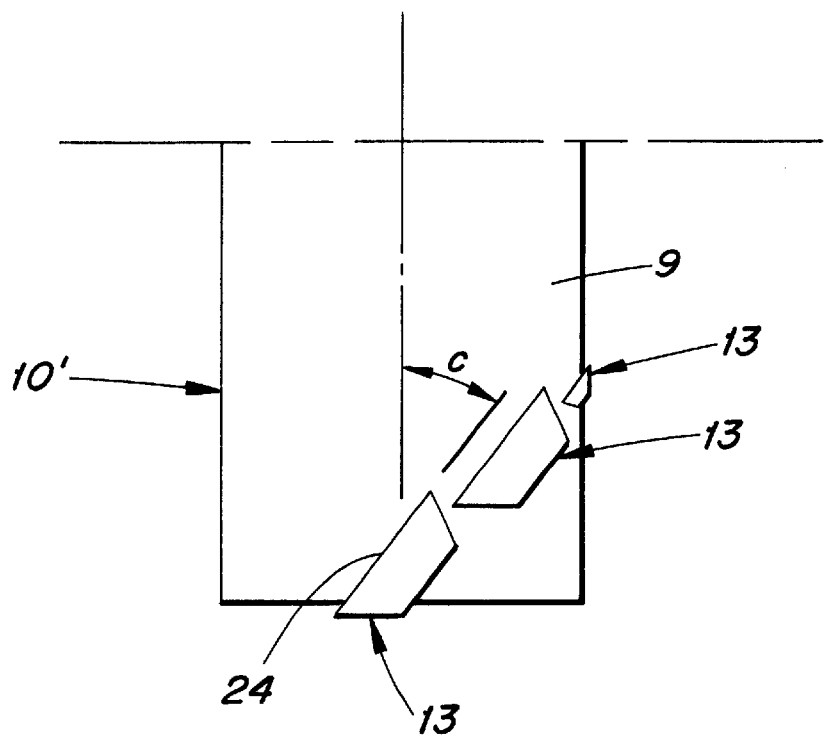
FIG. 6 is a schematic side elevational view of an end mill possessing more than one circumferential row of cutting inserts.
Figure 7:
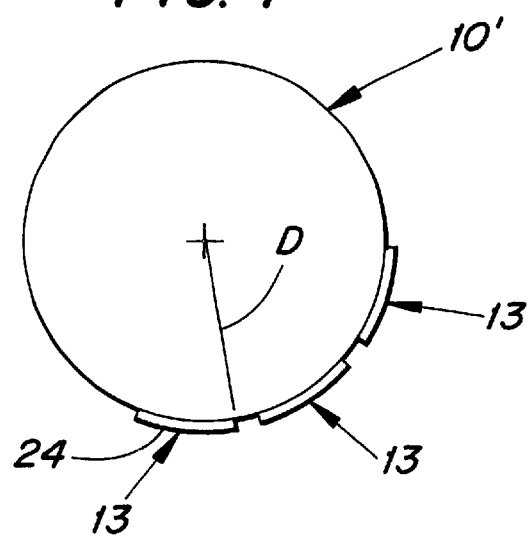
FIG. 7 is a schematic view taken in the direction parallel to an axis of rotation of an end mill depicting the orientation of the cutting edges of the cutting insert to the axis of rotation.

Each of the main cutting edges 24 is of slightly convex shape as viewed in a direction perpendicular to the top face (see FIG. 2). By making the main cutting edges convex, the insert 13 can be tilted relative the axis of rotation of the holder by an angle c as viewed in a direction perpendicular to the axis (see FIG. 6) while still keeping all portions of the active main cutting edge at a constant distance D from the axis of rotation (see FIG. 7). Thus, a true, 90-degree cut on the workpiece WP can be made without the forming of scratches that cannot be polished. It will thus be appreciated that the radius of curvature of each convex main cutting edge 24 is a function of the size of the angle of tilting c and the diameter of the cutter.

A lower portion 40 of each of the side surfaces 18 or 19 defines an abutment surface which engages the support surface 11b. Formed in at least the lower region 40 of each side surface 18, 19 is a recess 42 which extends to the bottom face 17. The recess 42 has a longitudinal length L' which is longer than the diameter of the cylindrical portion 15a of the center hole 15, and preferably at least 120% of that diameter.

The relative positioning between the cylindrical portion 15a of the center hole and each recess 42 is such that when the insert is viewed in a direction toward either of the side surfaces (see FIG. 3), the respective recess 42 extends beyond the entire cylindrical portion in the longitudinal direction of the insert. As a result, the convexity that results from the traditional pressing and sintering of an insert having a center hole (as described earlier) is completely eliminated, leaving only two planar (flat) segments 40a of the side surface. That is, there remains no convex segment on the abutment surface 40 of either side surface 18, 19. Accordingly, a stable support of the insert at its pocket is ensured, as the flat segments 40a engage a flat support surface 11b.

Figure 8:
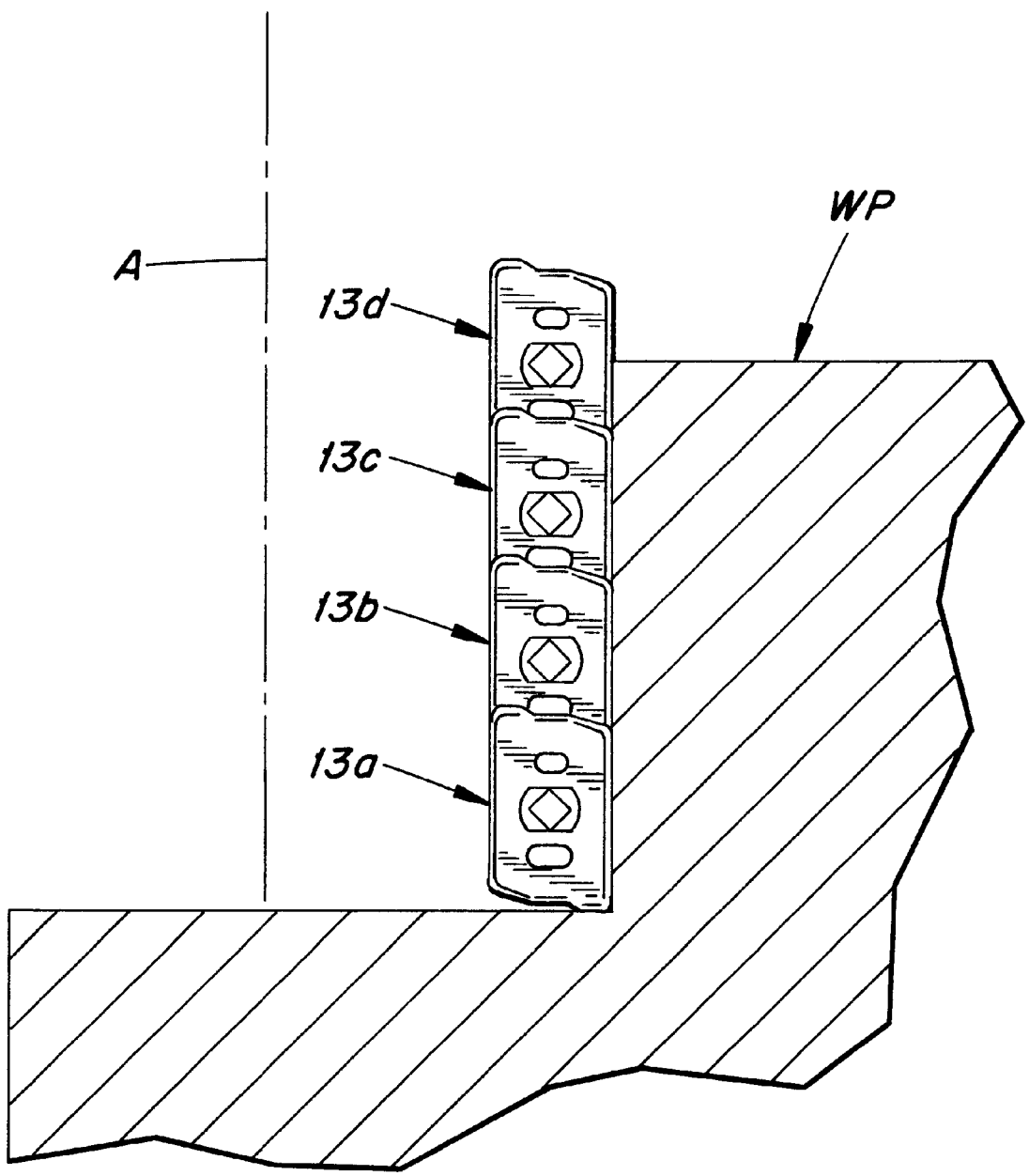
FIG. 8 is a schematic view depicting an arrangement of cutting inserts as they would cut relative to a workpiece in order to form a 90° shoulder therein.

In the above description, a single circumferential row of inserts 13 has been described. It will be appreciated, however, that plural annular rows of inserts can be provided on a milling tool 10', as shown in FIG. 8, wherein respective inserts 13a–13d of four circumferential rows of inserts are depicted as a 90 degree shoulder is being cut in a workpiece WP.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. Indexible cutting insert for chip forming machining, comprising a basically parallelogram shaped body formed of sintered powder, the body including:
   a top face forming two main cutting edges, each main cutting edge being convex as the insert is viewed in a direction perpendicular to the top surface;
   a bottom face;
   two longitudinal side surfaces extending downwardly relative to respective main cutting edges;
   two end faces spaced apart in a longitudinal direction of the insert, each end face having a bevel provided on a portion of the body protruding in the longitudinal direction from the remainder of the body;

each of the side surfaces having a height increasing toward a respective active cutting corner of the insert such that the active cutting corner is raised with respect to an opposite end of the respective side surface, the side surfaces being generally inclined at an acute angle toward the top face and at an obtuse angle toward the bottom face, an upper portion of each of the side surfaces comprising a wave-shaped primary clearance surface extending along the entire respective main cutting edge at a downward inclination to form a clearance angle;

a center hole extending completely through the body from the top face to the bottom face and including a cylindrical portion adapted to receive a threaded shank of a clamp screw, the center hole further including an enlarged portion adjacent the top face;

a lower region of each longitudinal side surface defining an abutment surface adapted to engage a support surface of an insert site of a holder, the lower region including a recess extending to the bottom surface and extending in the longitudinal direction for a distance longer than a diameter of the cylindrical portion of the center hole, wherein the recess extends beyond the entire cylindrical portion in the longitudinal direction of the insert as the insert is viewed in a direction toward the side surfaces.

2. The milling tool according to claim 1 wherein the distance is at last 120% of the diameter of the cylindrical portion.

3. A milling tool comprising:

a rotary shank forming at least one insert-receiving site having a floor, a support surface upstanding from the floor, and a threaded hole formed in the floor, the shank defining an axis of rotation extending in a longitudinal direction;

a cutting insert mounted in the site and comprising a basically parallelogram shaped body formed of sintered powder, the body including:
  a top face forming two main cutting edges, each main cutting edge being convex as the insert is viewed in a direction perpendicular to the top surface;
  a bottom face seated on the floor;
  two longitudinal side surfaces extending downwardly relative to respective main cutting edges;
  two end faces spaced apart in the longitudinal direction each end face having a bevel provided on a portion of the body protruding in the longitudinal direction from the remainder of the body;
  each of the side surfaces having a height increasing toward a respective active cutting corner of the insert such that the active cutting corner is raised with respect to an opposite end of the respective side surface, the side surfaces being generally inclined at an acute angle toward the top face and at an obtuse angle toward the bottom face, an upper portion of each of the side surfaces comprising a wave-shaped primary clearance surface extending along the entire respective main cutting edge at a downward inclination to form a clearance angle;
  a center hole extending completely through the body from the top face to the bottom face and including a cylindrical portion adapted to receive a threaded shank of a clamp screw, the center hole including an enlarged portion adjacent the top face;
  a lower region of each longitudinal side surface defining an abutment surface adapted to engage the support surface, the lower region including a recess extending to the bottom surface and extending in the longitudinal direction for a distance longer than a diameter of the cylindrical portion of the center hole, wherein the recess extends beyond the entire cylindrical portion in the longitudinal direction of the insert as the insert is viewed in a direction toward the side surfaces; and a clamp screw extending through the center hole and threadedly mounted in the threaded hole.

4. The milling tool according to claim 3 wherein the distance is at least 120% of the diameter of the cylindrical portion.

5. Indexible cutting insert for chip forming machining, comprising a body formed of sintered powder, the body including:
  a top face forming cutting edges;
  a bottom face;
  side surfaces extending downwardly relative to respective ones of the cutting edges;
  a center hole extending completely through the body from the top face to the bottom face and including a cylindrical portion adapted to receive a threaded shank of a clamp screw, the center hole further including an enlarged portion adjacent the top face;
  a lower region of each side surface defining an abutment surface adapted to engage a support surface of an insert site of a holder, the lower region including a recess extending to the bottom surface and extending in the longitudinal direction for a distance longer than a diameter of the cylindrical portion of the center hole, wherein the recess extends beyond the entire cylindrical portion in the longitudinal direction of the insert as the insert is viewed in a direction toward the side surfaces.

6. The milling tool according to claim 5 wherein the distance is at last 120% of the diameter of the cylindrical portion.

7. A milling tool comprising:

a rotary shank forming at least one insert-receiving site having a floor, a support surface upstanding from the floor, and a threaded hole formed in the floor, the shank defining an axis of rotation extending in a longitudinal direction;

a cutting insert mounted in the site and comprising a body formed of sintered powder, the body comprising:
  a top face forming cutting edges,
  a bottom face seated on the floor;
  side surfaces extending downwardly relative to respective ones of the cutting edges;
  a center hole extending completely through the body from the top face to the bottom face and including a cylindrical portion adapted to receive a threaded shank of a clamp screw, the center hole including an enlarged portion adjacent the top face;
  a lower region of each side surface defining an abutment surface adapted to engage the support surface, the lower region including a recess extending to the bottom surface and extending in the longitudinal direction for a distance longer than a diameter of the cylindrical portion of the center hole, wherein the recess extends beyond the entire cylindrical portion in the longitudinal direction of the insert as the insert is viewed in a direction toward the side surfaces; and a clamp screw extending through the center hole and threadedly mounted in the threaded hole.

8. The milling tool according to claim 7 wherein the distance is at least 120% of the diameter of the cylindrical portion.

* * * * *